United States Patent Office.

BENJAMIN F. SMITH, OF NEW ORLEANS, LOUISIANA.

Letters Patent No. 91,980, dated June 29, 1869.

IMPROVED PIPE FOR WATER, GAS, &c.

The Schedule referred to in these Letters Patent and making part of the same.

*To all whom it may concern:*

Be it known that I, BENJAMIN F. SMITH, of the city of New Orleans, parish of Orleans, and State of Louisiana, have invented a certain new, useful, and improved pipe or tube, to be applied to a variety of economic uses; and I do hereby declare the following to be a full, clear, and exact description of my method of making the same.

My object is to make pipes of small diameter, especially for the conduit of water and gas, but which may be applied to divers other purposes, that shall possess strength enough to resist a very considerable pressure both from within and without, and some degree of elasticity, so as to yield when water freezes in them, without breaking, at a greatly reduced cost, as compared with that of metallic, gutta-percha, India-rubber, and other tubes now in common use.

To effect this object, I take the common American swamp-canes, and subject them to a heat of about 140° Fahrenheit, in order to expel the destructive juices and acids, and to coagulate the albumen that, in their normal state, is contained in them. The heat may be dry, or superheated steam may be used, in connection with any suitable apparatus for making the application.

After the woody fibre or solid parts of the canes has been freed of all moisture, I introduce crude carbolic acid, or creosote into the vapor-pan or other recipient in which the desiccating-process has been conducted, and in this way impregnate the shells of the canes throughout all their parts, in order to prevent decay, &c.

As soon as a thorough impregnation is effected, which usually requires from four to eight hours, I fill the recipients or retorts with paraffine-varnish, thickened with about thirty-three per cent. of powdered slate and oxide of iron, or Bridgewater paint.

By means of a steam-coil, or other equivalent mechanical appliance, I boil the mass for two hours, and then draw off the surplus liquid, tar, or varnish, and apply dry heat from two to twenty-four hours, according to the nature of the varnish, or until the external and internal surfaces of the canes are sufficiently hardened for the particular use to which they are to be applied.

When the pipes are especially or exclusively designed for the conduit of water, twenty per cent. of coal-tar may be added to the paraffine, and more than the above-stated proportion of powdered slate.

The cane may be divided into short sections, so as to leave out the joints, or longer sections may be used, care being taken to remove the diaphragm at each joint which interrupts the continuity of the aperture, by heated metallic bars, or by boring.

Whatever the length of the sections, they are united by slipping one into another for a short space, the end of one being reamed out, and of the other reduced in size, to enable this to be done; or by covering the joint with a cane-sleeve, or by slipping a smaller into a larger section, or in any other suitable manner.

When prepared as above described, my invention provides a pipe, consisting simply of a union of single sections of canes, for conducting water in warm climates, or gas in any latitude, than which there is none more effective; but for climates in which water freezes in the winter season, I insert a section of a smaller cane into one of larger diameter, after enveloping the former with a covering of paper or cloth, and saturating the same with coal-tar, and thus duplicate the shell, to increase the elastic and resisting properties of my pipes, and thus to prevent a rupture from the freezing of the water in them.

In some cases I might even triplicate the shell in the same manner; but this, I think, will never be necessary.

Pipes made as I have described, possess exceeding strength, for I have demonstrated by experiment that when made of sections of single canes, they will endure an expansive pressure from compressed air of from three to five hundred pounds to the square inch, without yielding, and that one composed of triplicate sections will bear a pressure of one thousand pounds to the square inch, without giving way or leaking.

If elbows or flexures of any kind are necessary in a given pipe, metallic sections, which may readily be prepared of proper length and size, will be necessary.

Having thus described my invention,

What I claim, and desire to secure by Letters Patent, is—

1. The use of American swamp-cane, as a base for water, gas, and other conduit-pipes, substantially as herein described.

2. The process, substantially as herein described, of preparing American swamp-cane for use as water, gas, and other conduit-pipes.

BENJ. F. SMITH.

Witnesses:
H. N. JENKINS,
H. A. ARMSTRONG.